June 21, 1966 J. H. SCHMID ETAL 3,256,995
AUTOMATIC STRAINER

Filed July 5, 1963 3 Sheets-Sheet 1

INVENTORS
JOHN H. SCHMID
RAMON J. ZENTIS
BY

June 21, 1966  J. H. SCHMID ETAL  3,256,995
AUTOMATIC STRAINER

Filed July 5, 1963   3 Sheets-Sheet 2

INVENTORS
JOHN H. SCHMID
RAMON J. ZENTIS
BY

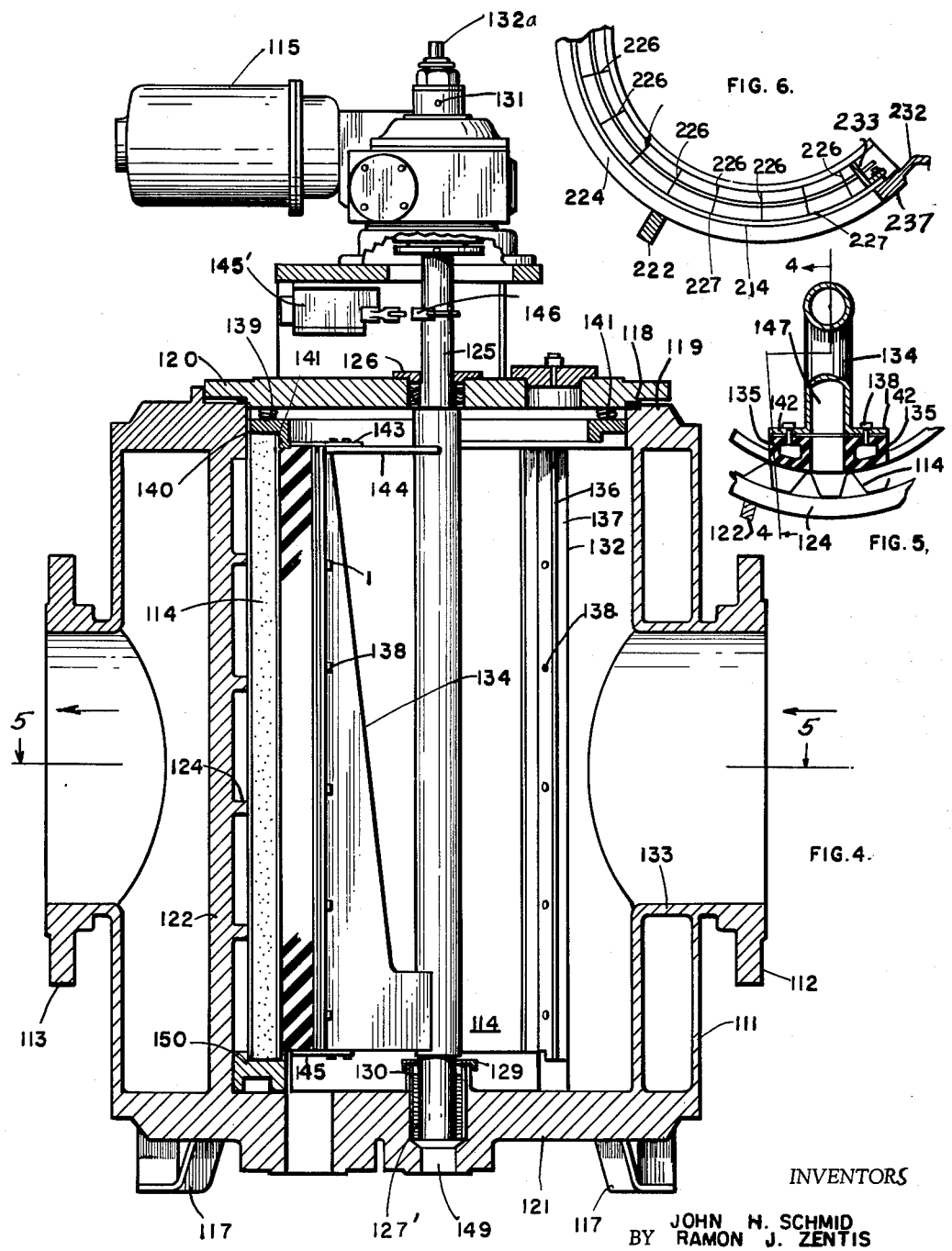

United States Patent Office 3,256,995
Patented June 21, 1966

3,256,995
AUTOMATIC STRAINER
John H. Schmid, Erie, and Ramon J. Zentis, McKean, Pa., assignors to Zurn Industries, Inc., Erie, Pa., a corporation of Pennsylvania
Filed July 5, 1963, Ser. No. 292,896
7 Claims. (Cl. 210—411)

This invention relates to strainers or filters and, more particularly, to strainers or filters of the automatic self-cleaning type.

Prior automatic strainers have various disadvantages. The present strainer overcomes many of the disadvantages in prior strainers.

In the present strainer, fluid with entrained debris enters the inlet port from the raw source which will usually have some primary protection like travelling screens if the raw water is taken directly from a lake, river, or ocean. The fluid passes straight through the screen element, depositing its debris on the multiple screen segments, and continues on out the outlet to the ultimate point of usage.

The screen element is usually of perforated stainless steel sheet die formed into modified sinusoidal convolutions for its full length. The screen is located in the strainer body with the convolutions vertical. The screen is formed into an arc of approximately two hundred forty degrees so that the screen represents two-thirds of a convoluted cylinder. The cylinder has a vertical axis offset upstream from the central axis of the strainer body and a diameter less than the inside diameter of the strainer body. The screen is high enough so that it extends from the bottom of the body to the cover and the open one hundred twenty degrees of its cylindrical shape faces upstream. The screen is backed up by a rigid cage arrangement firmly attached at the top and bottom to the strainer body.

During operation, the backwash arm slowly oscillates across the screen through a two hundred forty degree arc and subjects each strainer segment, in turn, to a reverse flow which ejects the debris into the hollow arm and shaft and from there down to the waste line. Thus, the waste and debris are disposed of in a positive mechanical process and do not depend on flotation or sedimentation. An example of a suitable positive internal pressure is five p.s.i.g or higher. Thus, reverse flow through the screen is due to the positive internal pressure imposed on the downstream side of the convolution being cleaned. Atmospheric pressure is imposed upon the other side since the waste line at the bottom is exposed to the atmosphere or a low pressure waste line.

In the second embodiment of the invention, the straining element is a fine wire mesh. The perforated plate has limited hole sizes depending upon the size which can be procured. For very fine straining, a fine wire mesh is used. The rigid supporting cage in the body remains essentially the same in both cases. A second cage having the same dimensions as the convoluted screen is used in place of the latter, the outer surface of this second cage being the mesh screen, with or without a heavier backing mesh. The mesh cage has vertical dividers on the same spacing centers as the original screen convolutions which provide pockets for debris in the same location as the convolutions did. The mesh cage is removable in the same way as the convoluted screen.

The rigid cage in the body supports the screen or mesh cage against pressures in the system. The cylindrical shape and heavy construction make it possible to have full line pressure drop across the straining medium without rupture of the medium.

The straining element, being offset upstream from the vertical body axis, provides a flow passage between the inner walls of the body and the outer walls of the cage which increases in size from the body inlet to the outlet. Thus, as cumulative flow outside the cage increases from the inlet to the outlet, the increase in flow passage reduces pressure drop as compared to a unit in which the cage is located on the same center line as the center line of the body with the flow passage thus being constant in size from inlet to outlet.

The strainer disclosed is suitable for automatic intermittent operation based upon pressure differential sensing control. The control is preset to actuate the starting mechanism when the inlet-outlet differential reaches an upper allowable limit, due to debris gathering on screens. The control will turn the mechanism off as soon as the pressure differential reaches the lower operational limit or at the end of a predetermined time interval. The interval could be controlled by a timer or the like. This method suits the usual requirement and assures controlled line pressure and adequate flow of clean water to the equipment. There is no mechanical operation or water wastage except when debris has gathered on the screen in sufficient quantitiy to cause incremental rise in pressure differential.

The device can also be automatically intermittently operated based upon a preset electric time switch control; for example, five minutes of operation per hour. This type of control can be reset at will to suit changed conditions. The device can also be operated by intermittent manual operation.

Another feature of this invention is the special hollow port seals mounted on the face of the backwash arm. Their function is to seal off the flow from the inlet side of the screen as well as from the adjacent screen elements so that the reverse flow is concentrated through a single segment at a time. The port seals are made of soft rubber and hollow molded in a special trapezoidal design shape and size. They thus prevent any damage to the screen or to themselves in the event that some large piece of debris should get past the primary screen into the strainer screen assembly.

The port seals are two facings, one on each side of the inlet slot of the backwash arm, which parallel the screen convolutions. They are as wide as one convolution and just clear the screen. Thus, when the slot is centered on a convolution cavity, the seals blanket the adjacent cavity on each side so there is no flow in either direction in these adjacent cavities and only reverse flow into the backwash arm will occur in the central cavity. As the arm moves, the cavity to the rear of the arm will be opened so flow will occur through it. The seal at each side of the cavity under the slot will continue to prevent short circuiting flow from the upstream side of the screen into the backwash arm until the slot is centered on the next cavity. With this motion, the seal on the forward side of the arm will begin to gradually blanket the next convolution in this direction while, at the same time, preventing short circuiting. Thus, the seals keep upstream pressure away from the slot in the backwash arm so pressure downstream from the screen will cause reverse flow through the screen into the arm over the area open to the slot in the arm.

If the seals were rigid instead of flexible, any sticks, bolts, or the like protruding from a convolution cavity into the path of the backwash arm would cause jamming and stop the travel of the arm. Even solid rubber would have undesirable rigidity. Sponge rubber would not hold up against the abrasive and tearing action which would occur. The seals are, therefore, made of a tough resilient rubber and are hollow through their entire length. The hollow seals are flexible enough so that they can easily deflect and ride over any obstruction without overstressing any of the parts. The hollow cavity thus allows the use of rubber with its inherent abrasion resistance while still providing sufficient flexure to clear obstructions.

The shaft is guided at the bottom by a self-lubricating Cutless type rubber bearing and at the top by a pre-packed Chevron seal, both of which are self-adjusting. ("Cutless" is a trademark of B. F. Goodrich Company.) The Cutless bearing has an internal bearing surface made of rubber which engages the shaft. The inner periphery of the bearing has axial slots. Water flowing through these slots directs sand particles or other abrasive matter out of the bearing to the drain. The shaft assembly is fully supported by a thrust bearing at the top of the strainer inside the gear reducer case.

Yet another important feature is the disengageable drive member. In the event of the power failure or whatever operational difficulty may occur, the operator can disengage the shear pin from the shaft and operate the blow-off valve and oscillate the pin manually be means of an ordinary wrench attached to the top of the shaft.

The convolute shape of the screen plus the full usage of the internal vessel space make for a very compact assembly which has an extremely large ratio of screen area to body size. The convolutions are spacious segments permitting the gathering of bulky debris like seaweed and leaves.

It is, accordingly, an object of the present invention to provide a strainer which is simple in construction, economical to manufacture, and simple and efficient to use.

Another object of the invention is to provide an improved strainer.

Still another object of the invention is to provide an improved screen in combination with a strainer.

A further object of the invention is to provide an improved flushing arrangement in a strainer.

A still further object of the invention is to provide a strainer having the improved features described herein.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawings:

FIG. 4 is a partial view similar to FIG. 1 of another embodiment of the invention taken on line 4—4 of FIG. 5;

FIG. 5 is a view taken on line 5—5 of FIG. 4; and

FIG. 6 is a view similar to FIG. 5 of another embodiment of the invention.

Figure 1:
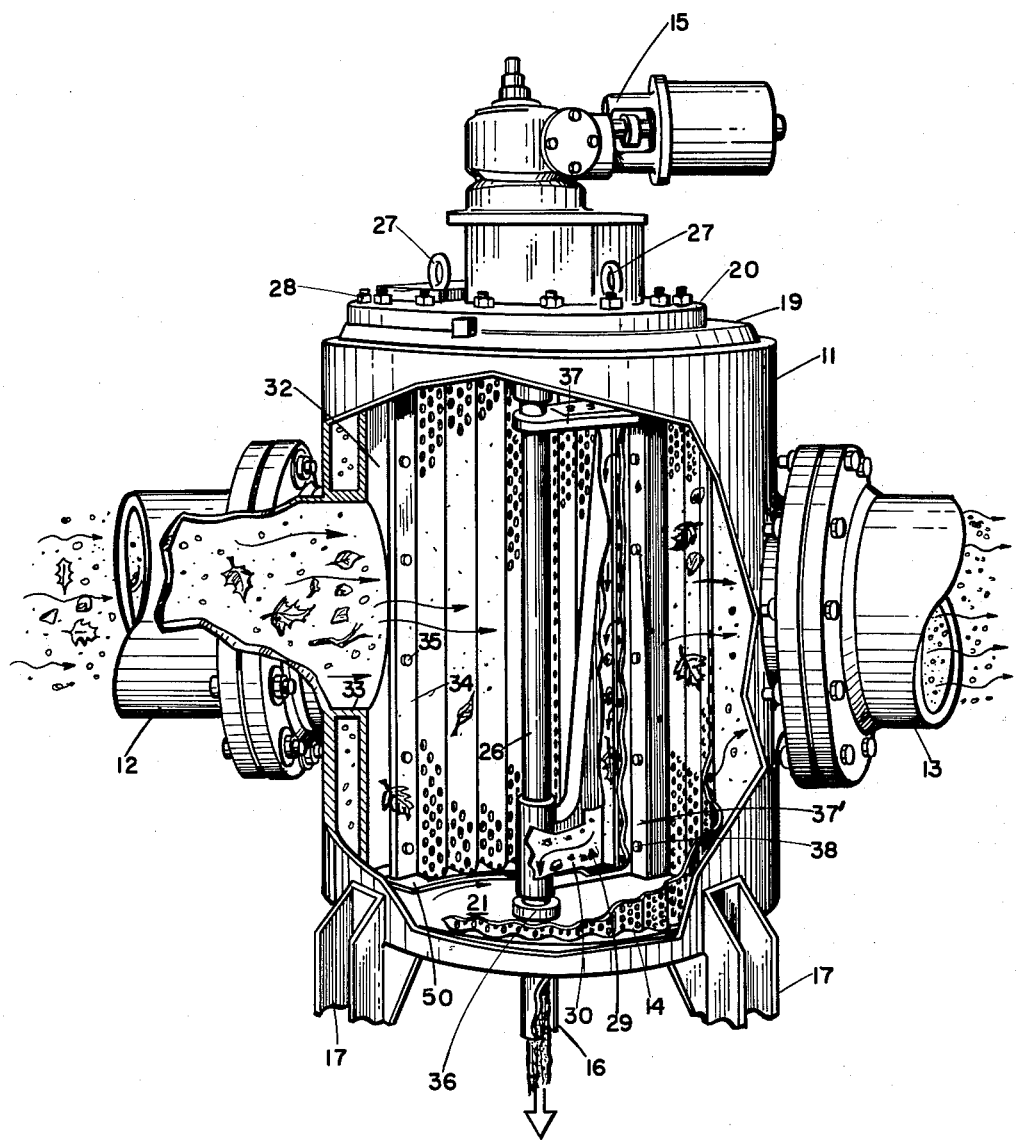
FIG. 1 is an isometric view of a strainer with parts broken away to show the inside thereof.

Now with more particular reference to the drawings, the strainer shown is made up of a hollow cylindrical body 11 having an inlet 12 at one side and an outlet 13 at the opposite side thereof. The cylindrical body 11 includes a hollow cylindrical shell made of sheet steel, for example. The inlet and outlet both have flanged bolted connections as shown to connect them to a pipe line.

A screen element 14 is made of perforated material such as screen. It may be a perforated stainless steel die formed sheet shaped generally to conform to the shape of a hollow cylinder open at one side. The element 14 is supported in the body 11 with its open side facing the inlet 12.

The strainer is supported in its hollow cylindrical shape with the axis of the cylinder which defines the strainer parallel to but offset in the upstream direction from the axis of the cylindrical body 11. The sheet may have the modified sinusoidal convolutions shown extending over its full length. The body 11 has a central shaft 26 which is hollow at the lower end and carries a backwash arm 29. The backwash arm might be defined as a manifold. It is attached to one side of the shaft 26 and the arm has a slot parallel to the axis of the shaft therein which faces the screen. The arm 29 has port seal 18 made of rubber like material which defines a slot. The port seals 18 ride over the inside surface of the screen convolutions. Since the pressure on the portion of the screen which is overlaid by the slot is low, water will flow from the downstream to the upstream side of the strainer into the slot and into the arm to backwash one convolution after another as the port seals 18 move over the screen.

The top of the body is closed by a ring 19 which may be welded to the upper edge of the shell in a suitable manner. A disk like head 20 is fastened to the ring 19 by means of studs 28. Lifting eyes 27 are attached to the head 20 for lifting it off of the strainer and, also for lifting the strainer. The lower end of the strainer is closed by a bottom plate 21 which may be welded or otherwise fastened in place. Feet 17 are attached to the bottom of the strainer to support it on a supporting surface.

The screen 14 is formed generally in the shape of a cylinder with an open side facing the inlet to the strainer. The screen itself may be made of perforated metal such as stainless steel or the like formed in a modified sinusoidal shape which extends over its full length as shown to provide convolutions which may receive foreign matter from the fluid. The strainer screen 14 is located in the strainer body where it forms a partition between the inlet 12 and the outlet 13. The screen itself extends over approximately two hundred forty degrees so that the screen isself forms two-thirds of a convoluted cylinder having its axis offset from the central axis of the body 11 and a diameter less than the inside diameter of the body 11. The screen is high enough so that it extends from the bottom plate 21 to the cover ring 19. The open side of the screen which represents one hunderd twenty degrees of the cylinder defined by the screen faces upstream.

The screen 14 is held in place and backed up by a rigid cage firmly attached at the top and bottom to the body 11. The cage is made up of longitudinally extending ribs 22 which may be welded to the bottom plate 21 at their lower ends and to the ring 19 at their upper ends. Hoops 23 may be welded to the vertical ribs 31 at their ends and to the ribs 22 at their intermediate points. These hoops form an open lattice with the ribs 22.

The cage is a cylinder with the same vertical axis as the screen and is an open lattice behind the screen but a continuous surface through the one hundred twenty degrees upstream of the screen except for the strainer inlet pipe which extends through the wall of the strainer body and into this continuous section of the screen supporting cage. Thus, any fluid is conducted by the inlet pipe into the cylindrical space formed by the screen and cage so that flow must be outwardly through the screen to reach the outlet of the body.

The ends of the screen 14 are sealed to the edges of the continuous portion of the supporting cage and the top and bottom of the screen also are sealed to prevent any fluid bypass of the screen. The recesses formed by the convolutions thus collect any debris. The backwash arm and sealing port shoe assembly have an outer radius which just clears the inner loops of the screen convolutions so that movement of the arm will not strike or jam against debris collected in the convolutions.

The upstream side of the strainer is closed by a plate 32 which has an opening therein which receives an extension 33 of the inlet 12. This plate is welded to the ring 19 at its upper end and to the bottom plate 21 at its lower end and its edges are welded to ribs 31. The ribs 31 are attached to a screen 34 by means of bolts 35. The lower end of the strainer screen convolutions rests on a plate 50 which, in turn, rests on the bottom plate 21.

The central shaft 26 is guided and supported against lateral movement in a Cutless rubber bearing 36 at its lower end which is disposed in the plate 21. The shaft 26 is supported against axial movement by means of a thrust bearing at its upper end in the assembly including gear reducer motor 15. The Cutless bearing carries the weight of the shaft 26 and a backwash arm 29 which is attached thereto. The shaft 26 is driven by a gear reducer motor 15 which is supported on the head 20. This serves to drive the shaft 26 through a removable shear pin.

The arm 29 has a channel like member 30 attached to it which increases in size from top to bottom. The arm 29 extends from a bracket 37 at the top to the lower end where it is welded to the shaft 26. The lower end of the shaft 26 is hollow as shown and the inside of the channel member 30 communicates with the hollow inside shaft 26 and with a backwash outlet 16.

The arm 29 has the spaced resilient hollow port seals 18 fixed thereto at opposite sides of the slot defined by the seals 18. These resilient seals 18 are fastened to laterally extending plates 37 which are welded to the arm. The resilient seals 18 are held in place by bolts 38.

It will be seen that the port seals 18 are at least substantially as wide as the spacing between the crests of two adjacent convolutions 24 and 25 and that they are spaced apart substantially equal to the spacing of two adjacent said convolutions. Thus, when the gear motor 15 rotates to oscillate the backwash arm 29 through approximately two hundred forty degrees from one side of the screen to the other, the two hollow seals will successively bridge each two adjacent said convolutions so that the slot defined by the seals 18 successively overlies the space between each two adjacent convolutions. The seals 18 bridge the space between two convolutions and then move on to the next space between the next two convolutions. It will be assumed that fluid pressure on the downstream side of the screen will be higher than the atmospheric pressure which prevails in the slot between the port seals. Thus, the flow of fluid will be through the particular space between the convolutions which are bridged by the port seals at any one time and the debris accumulated between the two convolutions will be washed down through the backwash arm 29 and out the backwash outlet 16.

The motor can be operated as frequently as conditions of sediment accumulation require.

Figure 2:
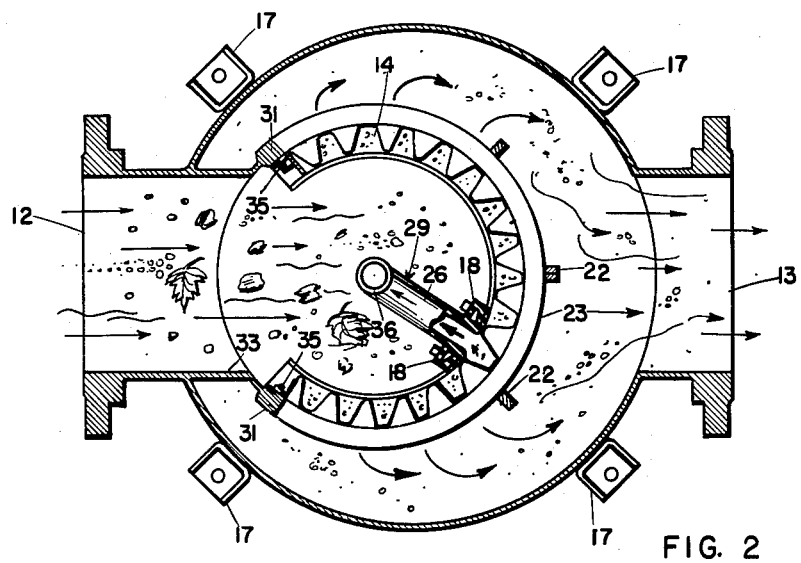
FIG. 2 is a horizontal cross sectional view of the strainer.
Figure 3:
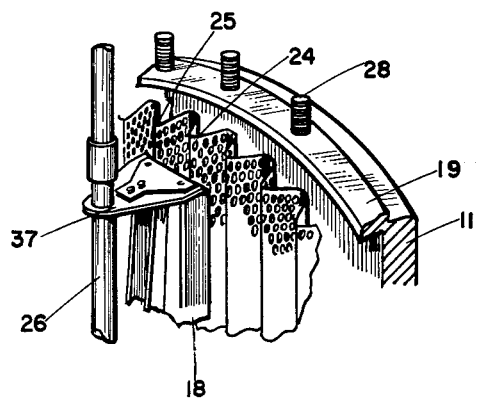
FIG. 3 is an enlarged view of the upper edge of the strainer and oscillator member.

In the embodiment of the invention shown in FIGS. 4 and 5, a strainer similar to that shown in the embodiment of FIGS. 1, 2, and 3 is disclosed. In this embodiment the strainer element may be a fine wire mesh. This strainer has a hollow cylindrical body 111 with an inlet 112 and an outlet 113 which may be fabricated from steel or the like by conventional methods. The inlet and outlet are suitably flanged for attaching in a pipe line. The cylindrical body 111 is closed at the top by a cover or head which is disk like in shape and indicated at 120. The cover 120 may be made removable and attached to a ring 119 by studs extending through the head 120 in the manner shown in FIG. 1. A suitable gasket 118 is supported on the upper end of the body 111 in a suitable groove as shown. The cover may be suitably machined as shown to rest on the gasket 118.

The cylindrical body 111 has a bottom 121 which closes is lower end and may be welded as shown integral therewith or supported thereon in any suitable way. Legs 117 may be welded to the side of the cylindrical body to support it.

Spaced ribs 122 extend from the top ring 119 to the bottom 121 and they may be welded or otherwise affixed to the top ring 119 and to the bottom 121. These ribs have vertically spaced hoop members 124 fixed thereto which extend in an upstream direction. The hoop members 124 have machined surfaces on the upstream side thereof which rest against a screen 114. These surfaces on the hoop members 124 engage the periphery of the convolutions of the screen 114 and hold it in precise position.

The screen 114 may be a fine wire mesh suitable for straining out fine particles. The screen is shaped generally to conform to the surface of a cylinder open at its upstream side. The upstream edges of the screen are fixed to a plate 132. The screen 114 has angle irons 136 welded to its upstream ends. These angle irons may have one leg thereof fixed to a thickened portion 137 of the plate 132 by means of cap screws 138.

A bottom ring 150 is H-shaped in cross section and the bottom legs of the H rest on the top surface of the bottom 121 while the upper legs of the H-shaped ring 150 receive the screen 114 therebetween. The front edges of the H-shaped ring 150 are welded to the lower ends of the thickened portion 137 of the plate 132.

A ring 141 is received against an annular surface 140 and the top edge of the screen 114 rests between the horizontal leg and the vertical leg of the ring 141. Helical compression springs 139 are disposed between the ring 141 and the cover 120.

A motor coupling and gear reducer is indicated at 115. It drives a shaft 125 which is received in a top packing gland 126 and a bottom Cutless bearing 127. A bearing water control ring 129 is supported around the shaft 125 and rests on top of an upwardly extending flange 130 which is integral with the bottom 121. This water ring allows some water to flow down from the inside of the strainer and through axially extending slots 127' in the bearing 127.

In case of a power failure, the strainer can be backwashed manually. A shear pin 131 extends through the drive mechanism of the gear motor and through the shaft 125. Should this pin shear or be removed, the device can be operated by attaching a wrench to a wrench receiving end 132a and rotating the device.

The center shaft 125 is fixed to a backwash arm 134. The backwash arm is hollow and has port seals 135 fixed to the flanges 142 thereof by means of the cap screws 138. These port seals are in the form of elongated hollow members which slide along and just clear the inside surface of the crest on the convolutions on the screen 114 as the arm 134 moves. They form sealing engagement therewith. It will be noted that the surface of the port seals 135 which contacts the screen is of a width between two adjacent crests of the screen 114.

The upper edge of the arm 134 has a port end plate 143 fixed thereto by means of an arm 144. The lower end of the arm has a plate 145 fixed thereto. The ends of the plate 145 run close to the inner edge of the angle ring 141 and the ring 150. The port seals 135 slide along the lower surface of the rings 141 and 150. A limit switch 145' is fixed relative to the shaft 125.

When the shaft 125 is oscillated by the motor to bring the arm 134 from one position adjacent one side of the plate 132, the limit switch 145' reverses the motor 115 and causes it to drive the arm 134 back around the inner periphery of the screen to the other end of the screen. As the port seals cross from one crest to the other, the pressure of fluid on the downstream side of the screen forces any sediment back through an opening 147 in the arm 134 so that it flows down through the lower part of the hollow shaft and into the drain at 149.

The embodiment of the invention shown in FIG. 6 discloses a screen 214 having its front edges fastened to a plate 232 by means of an angle iron 233. A thickened portion 237 of the plate 232 is fixed to the screen by the angle iron 233.

A cage 222 may be identical to the cage in the other embodiments of the invention; however, the screen in the embodiment shown in FIG. 6 is a plain mesh screen which is generally cylindrical in shape with an open side facing the inlet to the strainer. Instead of the single screen, two separate screens, one a coarse screen and the other a fine screen, can be disposed concentric to each other with the coarse screen forming a support for the fine screen. The coarse screen may be of perforated metal and the fine screen may be of woven mesh.

The mesh cage 222 is made of vertically extending fins 226 which are fixed thereto at their upper and lower ends. An outer edge 227 of each fin rests against the screen 214 and the inner edges of the fins are disposed in a path defining the surface of a cylinder through which the outer edges of the port seals move. Thus, the fins 226 form partitions or cavities which are individually closed as the arm moves around so that the portion of the screen defining one side of each cavity is backwashed in the same manner that the space between two convolutions is backwashed in the other embodiments of the invention.

The strainer body may be made so that the mesh cage and screen in the embodiment shown in FIG. 6 can be removed and replaced by a convoluted screen such as shown in the other embodiments of the invention.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A strainer comprising
   a hollow body having an inlet for fluid at one side and an outlet for fluid at the opposite side,
   a screen shaped in the general form of a hollow cylinder, said screen including an opening along the length thereof defined by a plane passing through a chord of said cylinder and parallel to the axis thereof, said screen being disposed between said inlet and said outlet with said opening in said screen in alignment with said inlet and said outlet,
   a backwash arm having a slot therein wth a shoe member on each side of said slot,
   means to swing said arm to move said shoe members over the inside of said screen from one side of said opening in said screen to the other with said shoe members sealingly engaging said screen and sliding thereover and directing fluid from the downstream side of said screen through said slot,
   and means to drain said fluid from said slot.

2. The strainer recited in claim 1 wherein
   said shoe members are hollow and trapezoidal in cross section,
   one side of each shoe member being fixed to said arm and another side sliding over said screen.

3. The strainer recited in claim 1 wherein
   a cage is provided on the downstream side of said screen,
   said cage comprising a plurality of spaced longitudinally extending ribs and a plurality of spaced cylindrical hoops.

4. The strainer recited in claim 1 wherein
   said screen comprises a coarse screen member and a fine screen member disposed concentric to each other with said coarse screen member on the downstream side of said fine screen member,
   and spaced, parallel fins on the upstream side of said coarse screen member defining segments of said screen.

5. A strainer comprising
   a hollow cylindrical body having an inlet at one side and an outlet at the opposite side thereof,
   a strainer member made of a perforated material and shaped generally to conform to the shape of a hollow cylinder, said strainer member including an opening along the length thereof defined by a plane passing through a chord of said cylinder and parallel to the axis thereof,
   said strainer member disposed in said hollow body with said opening in alignment with said inlet and outlet and with the axis of said strainer member generally parallel to the axis of said cylindrical body,
   a shaft disposed in said body and in said strainer member substantially on the central axis of said cylinder defining said strainer member,
   the lower end of said shaft being hollow, a drain connected to the lower end of said shaft,
   an arm attached to said shaft and having spaced sealing means thereon defining a slot extending generally parallel to said shaft,
   said slot communicating with said hollow shaft,
   said sealing means engaging said strainer member,
   and means to rotate said shaft to move said sealing means over said strainer member whereby debris accumulated on the upstream side of said strainer member is forced into said slot and thence into said drain.

6. The strainer recited in claim 5 wherein
   said strainer member is in the form of a perforated sheet formed into generally sinusoidal convolutions,
   and said sealing means comprise spaced resilient members disposed generally parallel to said convolutions,
   said resilient members being spaced substantially equal to the spacing of said convolutions whereby said resilient members successively bridge the space between each two adjacent said convolutions and said slot receives debris successively from between each two adjacent said convolutions.

7. The strainer recited in claim 5 wherein
   said shaft is connected to an electric motor by means of a removable pin,
   and means is provided on said shaft to rotate it manually when said pin is removed.

References Cited by the Examiner

UNITED STATES PATENTS

| | | | |
|---|---|---|---|
| 410,767 | 9/1889 | Pierce | 210—338 |
| 2,066,479 | 1/1937 | MacIsaac | 210—82 X |
| 2,663,599 | 12/1953 | Mackay et al. | 308—238 X |
| 2,755,938 | 7/1956 | Alcock | 210—392 |
| 2,835,390 | 5/1958 | King | 210—411 |
| 2,919,807 | 1/1960 | Briggs | 210—487 |

FOREIGN PATENTS

| | | |
|---|---|---|
| 794,663 | 5/1958 | Great Britain. |

REUBEN FRIEDMAN, *Primary Examiner.*

FRANK W. LUTTER, *Examiner.*

S. WILLIAMS, *Assistant Examiner.*